United States Patent [19]

Cassidy et al.

[11] Patent Number: 5,081,211

[45] Date of Patent: Jan. 14, 1992

[54] POLYISOCYANATE COMPOSITIONS

[75] Inventors: Eduard F. Cassidy, Ukkel; Jan W. Leenslag, Neerijse, both of Belgium

[73] Assignee: Imperial Chemical Industries PLC, London, England

[21] Appl. No.: 400,639

[22] Filed: Aug. 30, 1989

Related U.S. Application Data

[63] Continuation-in-part of Ser. No. 378,445, Jul. 7, 1989, Pat. No. 4,935,460, which is a continuation of Ser. No. 242,745, Sep. 9, 1988, abandoned, which is a continuation-in-part of Ser. No. 160,647, Feb. 26, 1988, Pat. No. 4,794,129, which is a continuation-in-part of Ser. No. 105,641, Oct. 6, 1987, abandoned.

[30] Foreign Application Priority Data

Sep. 9, 1988 [GB] United Kingdom ............. 8821186
Jan. 16, 1989 [GB] United Kingdom ............. 8900855

[51] Int. Cl.$^5$ .............. C08G 18/77; C08G 18/78; C08G 18/79
[52] U.S. Cl. ................. 528/67; 528/68; 528/76; 528/83
[58] Field of Search ............ 528/67, 68, 76, 83

[56] References Cited

U.S. PATENT DOCUMENTS

| | | | |
|---|---|---|---|
| 3,793,268 | 2/1974 | Dietrich et al. | 528/67 |
| 4,077,989 | 3/1978 | Shafer et al. | 260/404.5 |
| 4,260,718 | 4/1981 | Farrissey et al. | 528/60 |
| 4,306,052 | 12/1981 | Bont et al. | 528/67 |
| 4,344,855 | 8/1982 | Schafer et al. | 528/67 |
| 4,703,100 | 10/1987 | Rosshofer et al. | 528/67 |
| 4,789,791 | 12/1988 | Matzke et al. | 528/76 |
| 4,801,644 | 1/1949 | Coogan | 528/85 |
| 4,933,416 | 6/1990 | Gillis et al. | 528/76 |
| 5,002,830 | 3/1991 | Gillis et al. | 528/76 |

FOREIGN PATENT DOCUMENTS

| | | |
|---|---|---|
| 032011 | 7/1981 | European Pat. Off. |
| 0099519 | 1/1984 | European Pat. Off. |
| 287947 | 10/1988 | European Pat. Off. |
| 2259119 | 8/1975 | France |

*Primary Examiner*—John Kight, III
*Assistant Examiner*—Rabon Sergent

[57] ABSTRACT

Polyisocyanate compositions with useful properties are obtained by reacting uretonimine and/or carbodiimide modified polyisocyanates with carboxylic acids.

The polyisocyanate compositions are useful in the preparation of elastomeric products.

8 Claims, No Drawings

POLYISOCYANATE COMPOSITIONS

This is a continuation-in-part of Ser. No. 07/378,445, filed July 7, 1989, now U.S. Pat. No. 4,935,460, which is a continuation of Ser. No. 07/242,745, filed Sept. 9, 1988, now abandoned, which is a continuation-in-part of Ser. No. 07/160,647, filed Feb. 26, 1988, now U.S. Pat. No. 4,794,129, which is a continuation-in-part of Ser. No. 07/105,641, filed Oct. 6, 1987, now abandoned.

This invention relates to polyisocyanate compositions and to their use in the manufacture of polyurethane and other polymeric materials.

The manufacture of useful polymeric materials by reacting organic polyisocyanates with compounds containing a plurality of isocyanate-reactive groups is well established. Thus, polyurethane materials, which may be flexible or rigid, foamed or unfoamed, are produced on a large scale by reacting polyisocyanates with low and/or high molecular weight polyhydroxy compounds. Similarly, polyurea products are obtained by reacting polyisocyanates with polyamines.

The organic polyisocyanates used in these reactions include simple aliphatic and aromatic diisocyanates but also more complex derivatives thereof containing urethane, urea, allophanate, biuret, carbodiimide, uretonimine or isocyanurate residues. In some cases, these modified polyisocyanates are used in order to provide a liquid form of a normally solid isocyanate compound, for example the so-called MDI variants. In other cases, they are used to provide other desired technical effects.

It has now been found that useful polyisocyanate compositions may be obtained by reacting uretonimine and/or carbodiimide modified polyisocyanates with carboxylic acids.

Accordingly, the present invention provides a polyisocyanate composition which is the product of reacting a uretonimine and/or carbodiimide modified polyisocyanate with a carboxylic acid.

Polyisocyanates containing carbodiimide and/or uretonimine groups and methods for their preparation have been fully described in the prior art. In general, these modified polyisocyanates are obtained by contacting an organic polyisocyanate such as diphenylmethane diisocyanate (MDI) with a carbodiimidisation catalyst (commonly a phosphorus compound) to form a carbodiimide modified polyisocyanate which reacts with further polyisocyanate forming a uretonimine modified polyisocyanate, the carbodiimide/uretonimine ratio varying with temperature. The level of uretonimine and/or carbodiimide modification of the polyisocyanates used in accordance with the invention may vary over a wide range.

Organic polyisocyanates which may be used in the preparation of the uretonimine and/or carbodiimide modified polyisocyanates include aliphatic, cycloaliphatic and araliphatic polyisocyanates, for example hexamethylene diisocyanate, isophorone diisocyanate, cyclohexane-1,4-diisocyanate, dicyclohexylmethane-4,4'-diisocyanate and p-xylylene diisocyanate. The preferred polyisocyanates, however, are the aromatic polyisocyanates, 1,5-naphthylene diisocyanate and especially the available MDI isomers, that is to say 4,4'-diphenylmethane diisocyanate, 2,4'-diphenylmethane diisocyanate and mixtures thereof with each other or with other polyisocyanates.

Carboxylic acids which may be used in the preparation of the polyisocyanate compositions of the invention may contain one or more carboxylic acid groups per molecule and may be polymeric or non-polymeric in structure. Suitable acids include simple aliphatic or aromatic mono- or dicarboxylic acids. Polycarboxylic acids which are liquids at the temperatures used for reaction with the uretonimine and/or carbodiimide modified polyisocyanate, that is to say at temperatures of 120° C. or below, are preferred.

Examples of suitable liquid polycarboxylic acids include the commercially available dimer acids obtained by the dimerisation of unsaturated fatty acids as well as carboxy terminated polymers, for example polynitriles, polyesters or polyethers. Carboxy terminated polyesters may be obtained in known manner by reacting polyhydric alcohols, for example glycols, with a stoichiometric excess of a polycarboxylic acid or anhydride thereof. Carboxy terminated polyethers may be obtained by reacting a polyether polyol with a polycarboxylic acid or anhydride, a large excess of the acid component being used when it is desired to minimise chain extension.

In addition to carboxy terminated polyethers wherein each chain end carries a single carboxy group, for example a reaction product of a polyether polyol and an excess of a dicarboxylic anhydride, there may be used polyethers wherein each chain end carries two or more carboxy groups, for example reaction products of a polyether polyol and a tricarboxylic acid anhydride or a tetracarboxylic acid dianhydride.

In particular, there may be used carboxy terminated reaction products of polyoxyalkylene polyol having hydroxyl functionalities of from 2 to 8 and average molecular weights of from 200 to 10000 with acids or acid anhydrides such as maleic anhydride, phthalic anhydride, trimellitic anhydride or pyromellitic dianhydride. Suitable polyoxyalkylene polyols are well known in the art and may be based on propylene oxide, butylene oxide, ethylene oxide, tetrahydrofuran and combinations thereof. Polyoxypropylene and poly(oxypropylene/oxyethylene) polyols are generally preferred.

Reaction between the uretonimine and/or carbodiimide modified polyisocyanate and the carboxylic acid is preferably effected under such conditions that reaction between the carboxylic acid and the free isocyanate groups of the polyisocyanate as well as reactions between the free isocyanate groups are minimised. Such conditions include the use of reaction temperatures below 120° C., preferably not exceeding 100° C. with an initial ratio of uretonimine/carbodiimide to carboxy groups of at least 1:1 and with no catalyst present. Where it is desired that reaction should also take place between carboxy groups and some of the isocyanate groups, or between the free isocyanate groups, higher reaction temperatures and/or suitable catalysts, for example phospholene oxides, may be used.

It is believed that the polyisocyanate compositions of the invention derived from uretonimine and/or carbodiimide modified polyisocyanates based on diisocyanates of the formula R(NCO)$_2$, wherein R represents a divalent hydrocarbon radical, for example methylene-bisphenylene, contain terminal groups of the formula:

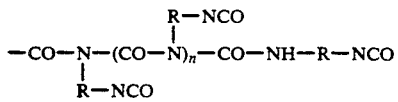

wherein n is 0 (in the case of a carbodiimide based material) or 1 (in the case of a uretonimine based material).

The polyisocyanate compositions of the invention have relatively low viscosities because of the very low degree of chain extension which takes place during their preparation. This is in marked contrast to some of the modified polyisocyanates of the prior art which are prepared from such reactants and under such conditions that a significant degree of chain extension is unavoidable.

The compositions of the invention, either alone or in conjunction with other organic polyisocyanates, may be reacted with active hydrogen containing materials, using known techniques, to form polyurethane, polyurea and other useful polymeric materials. Thus, those compositions having relatively low molecular weights and high isocyanate functionalities may be used in the preparation of highly crosslinked products, for example rigid polyurethane foams, whilst those compositions having higher molecular weights and/or higher isocyanate functionalities may be used in the preparation of elastomeric products, for example flexible polyurethane foams and polyurethane or polyurea elastomers, including reaction injection moulded (RIM) elastomers.

In the production of RIM elastomers, a liquid stream comprising a polyisocyanate composition of the invention may be impingement mixed with a second liquid stream typically containing an isocyanate reactive soft-block component, for example a polyol, polyamine, imino-functional compound or enamine compound having an equivalent weight of at least 750 and an isocyanate-reactive chain extender, for example an aromatic diamine having a molecular weight of 100 to 400 such as a diethyl toluene diamine.

The invention is illustrated but not limited by the following Examples 1-10. Examples 11-14 have been included for comparative purposes. In the Examples, all parts and percentages are expressed on a weight basis. All elastomer properties were measured in accordance with standard methods

EXAMPLE 1

Prepolymer 1, having an isocyanate content of 26.51% by weight, was prepared by reacting 15 parts of a 3600 Mw carboxylic acid-ended difunctional liquid nitrile rubber (HYCAR ® 1300 X 8, B. F. Goodrich Co.) with 85 parts of a 20% uretonimine/carbodiimide modified 4,4'-diphenylmethane diisocyanate having an NCO content of 29.5%. The reaction was carried out at 100° C. for 2 hours.

EXAMPLE 2

Prepolymer 2, having an isocyanate content of 26% by weight, was prepared by reacting 15 parts of a 600 Mw carboxylic acid-ended difunctional unsaturated fatty acid dimer (EMPOL® 1009, Unicherma) with 85 parts of a 20% uretonimine/carbodiimide modified 4,4'-diphenyl methane diisocyanate. The reaction was carried out at 100° C. for 2 hours.

EXAMPLE 3

Prepolymer 3, having an isocyanate content of 25.19% by weight, was prepared by reacting 13 parts of a 600 Mw carboxylic acid-ended difunctional unsaturated fatty acid dimer (EMPOL ® 1009, Unichema) with 87 parts of a 20% uretonimine/carbodiimide modified 4,4'-diphenylmethane diisocyanate. The reaction was carried out at 100° C. for 2 hours.

EXAMPLE 4

Prepolymer 4, having an isocyanate content of 23.57% by weight, was prepared by reacting 20 parts of a 3600 Mw carboxylic acid-ended difunctional liquid nitrile rubber HYCAR ® 1300 X 8, B. F. Goodrich Co.) with 80 parts of a 20% uretonimine/carbodiimide modified 4,4'-diphenylmethane diisocyanate. The reaction was carried out at 100° C. for 2 hours.

EXAMPLE 5

Prepolymer 5, having an isocyanate content of 23.57% by weight, was prepared by reacting 20 parts of a 2200 Mw carboxylic acid-ended polyoxypropylene glycol (maleic anhydride capped PPG 2000) with 80 parts of a 20% uretonimine/carbodiimide modified 4,4'-diphenylmethane diisocyanate. The reaction was carried out at 100° C. for 2 hours.

The carboxy-terminated polyether used in this Example was prepared as follows:

A solution of 3.35 parts of potassium hydroxide in 3.35 parts of water was mixed with 200 parts of polypropylene glycol of molecular weight 2000. The water was removed by stirring under reduced pressure at 80° C. after which 19.6 parts of maleic anhydride was added. Stirring was continued for a further 2 hours, the end of the reaction being observed by the disappearance of the anhydride absorption band at 1840 cm$^{-1}$ in the infra-red spectrum.

Polyurea elastomers were prepared using the reaction injection moulding (RIM) process by injecting two liquid streams, maintained at ca. 40° C., of polyisocyanate and polyamine, under pressure (ca. 200 bar), into a closed mould for subsequent reaction. The steel mould employed was of the dimensions 30 cm × 30 cm × 3 mm, and was maintained at ca. 90° C. The elastomers were removed from the mould 20 seconds after injection, and were post thermally treated by placing them in a vented oven maintained at ca. 160° C. for ca. 30 minutes. Physical properties of the elastomers were measured within 3 days of their post thermal treatment.

EXAMPLE 6

Polyurea elastomer 1 was prepared, using the RIM process previously described, by reacting 41.52 parts of prepolymer 4 with 40.94 parts of a 5000 Mw polyoxypropylene triamine and 17.54 parts of an 80/20 isomer mixture of 2,4- and 2,6-diethyltoluene diamines (DETDA).

EXAMPLE 7

Polyurea elastomer 2 was prepared by reacting 43.82 parts of prepolymer 4 with 39.33 parts of the polyether triamine used in Example 6 and 16.85 parts of DETDA.

EXAMPLE 8

Polyurea elastomer 3 was prepared by reacting 41.52 parts of prepolymer 5 with 40.94 parts of the polyether triamine used in Example 6 and 17.54 parts of DETDA.

EXAMPLE 9

Polyurea elastomer 4 was prepared by reacting 43.82 parts of prepolymer 5 with 39.33 parts of the polyether triamine used in Example 6 and 16.85 parts of DETDA.

| PHYSICAL PROPERTIES OF POLYUREA ELASTOMERS | | | | |
| --- | --- | --- | --- | --- |
| POLYUREA ELASTOMER | 1 | 2 | 3 | 4 |
| FLEXURAL MODULUS (MPa) | 435 | 440 | 600 | 651 |
| DENSITY (KG/M$^3$) | 1074 | 1074 | 1100 | 1120 |
| HARDNESS (SHORE D) | 61 | 64 | 67 | 67 |
| TENSILE STRENGTH (KPa) | 23707 | 28891 | 36484 | 33636 |
| ELONGATION (%) | 188 | 186 | 161 | 125 |
| HEAT SAG (mm) 30' | 4.5 | 4.5 | 2.0 | 1.5 |
| [150 mm O/H, 160° C.] 60' | 12.0 | 11.0 | 3.5 | 6.0 |
| CLTE (alpha. 10$^{-6}$/°C.) | 172 | 124 | 135 | 117 |
| IMPACT (J) +20° C. | 81 | 87 | 78 | 75 |
| [FALLING DART] −20° C. | 45 | 48 | 40 | 67 |

EXAMPLE 10

COMPARATIVE EXAMPLE

Prepolymer 6, having an isocyanate content of 23.5% by weight, was prepared by reacting 25 parts of a 2000 MW polyoxypropylene glycol with 65 parts of an 80/20 mixture of 4,4'- and 2,4'-diphenylmethane diisocyanates. 10.0 parts of a uretonimine/carbodiimide modified diphenylmethane diisocyanate having an isocyanate content of 29.5% by weight was stirred into this prepolymer after preparation.

EXAMPLE 11

COMPARATIVE EXAMPLE

Prepolymer 7, having an isocyanate content of 20.92% by weight, was prepared by reacting 33.88 parts of a 5000 MW polyoxpropylene triol with 56.12 parts of an 80/20 mixture of 4,4'- and 2,4'-diphenylmethane diisocyanates. 10.0 parts of a uretonimine/carbodiimide modified diphenylmethane diisocyanate having an isocyanate content of 29.5% by weight was stirred into this prepolymer after preparation.

EXAMPLE 12

COMPARATIVE EXAMPLE

Polyurea elastomer 5, not pertaining to this invention, was prepared according to the RIM process previously described. It was prepared by reacting 39.39 parts of prepolymer 6 with 44.24 parts of the polyether triamine used in Example 6 and 16.37 parts of DETDA.

EXAMPLE 13

COMPARATIVE EXAMPLE

Polyurea elastomer 6, not pertaining to this invention, was prepared according to the RIM process by reacting 44.44 parts of prepolymer 7 with 38.89 parts of the polyether triamine used in Example 6 and 16.67 parts of DETDA.

| PHYSICAL PROPERTIES OF ELASTOMERS | | |
| --- | --- | --- |
| POLYUREA ELASTOMER | 5 | 6 |
| FLEXURAL MODULUS (MPa) | 359 | 351 |
| DENSITY (KG/M$^3$) | 1088 | 1103 |
| HARDNESS (SHORE D) | 58 | 59 |
| TENSILE STRENGTH (KPa) | 25000 | 28652 |
| ELONGATION (%) | 300 | 260 |
| HEAT SAG (mm) 30' | 5.0 | 10.0 |
| [150 mm O/H, 160° C.] 60' | 16.0 | 28.0 |
| CLTE (alpha. 10$^{-6}$/°C.) | 132 | 130 |
| IMPACT (J) +20° C. | 47 | 100 |
| [FALLING DART] −20° C. | 38 | 46 |

All elastomers prepared according to the present invention showed higher modulus and improved modulus-/impact combinations than those of the comparative Examples. Also, elastomers prepared according to the present invention showed improved thermal stability over those of the comparative Examples.

We claim:

1. A reaction system for use in making a reaction injection moulded elastomer, said system comprising the following components:
   A) a polyisocyanate composition which is the product of reacting a uretonimine and/or carbodiimide modified polyisocyanate with a carboxy terminated polycarboxylic acid polyether or polyester, and
   B) an isocyanate-reactive component comprising at least one softblock component selected from polyols, polyamines, imino-functional compounds, enamine-containing compounds and mixtures thereof having equivalent weights of at least 750 and at least one chain extender selected from polyols, polyamines, imino-functional compounds, enamine-containing compounds and mixtures thereof having equivalent weights below 750.

2. A reaction system according to claim 1 wherein the chain extender comprises an aromatic diamine having a molecular weight from about 100 to about 400.

3. The reaction system of claim 1 wherein the uretonimine and/or corbodiimide modified polyisocyanate comprises a uretonimine and/or carbodiimide modified aromatic polyisocyanate.

4. The reaction system of claim 3 wherein the uretonimine and/or carbodiimide modified aromatic polyisocyanate comprises a uretonimine and/or carbodiimide modified diphenylmethane diisocyanate.

5. The reaction system of claim 1 wherein the carboxy terminated polycarboxylic acid polyether or polyester is liquid at 120° C. or below.

6. The reaction system of claim 1 wherein the polyisocyanate composition is the product of reacting a uretonimine and/or carbodiimide modified polyisocyanate with a polycarboxylic acid polyether which is a carboxy terminated polyether having one or more carboxy groups at each chain end.

7. The reaction system of claim 6 wherein the carboxy terminated polyether comprises a carboxy terminated reaction product of a polyoxyalkylene polyol having a hydroxyl functionality of from 2 to 8 and an average molecular weight of from 200 to 10,000 and a tricarboxylic acid anhydride or a tetracarboxylic acid dianhydride.

8. The reaction system of claim 1 wherein the polyisocyanate composition is the product of reacting a uretonimine and/or carbodiimide modified polyisocyanate with a carboxy terminated polycarboxylic acid polyether or polyester at a temperature below 120° C., in the absence of a catalyst, and with an initial ratio of uretonimine/carbodiimide to carboxy groups of at least 1:1.

* * * * *